March 31, 1959 — E. M. DEXTER — 2,880,335
INDUCTION MOTOR
Filed March 30, 1956 — 2 Sheets-Sheet 1
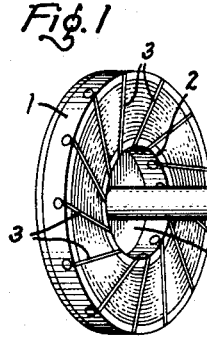
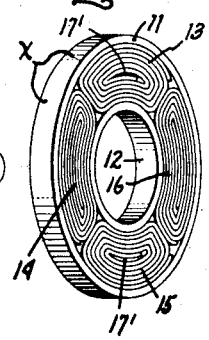
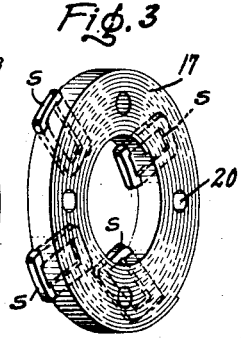
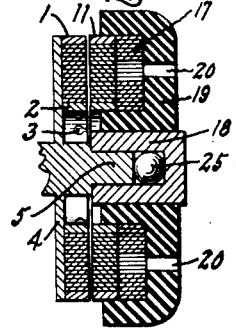
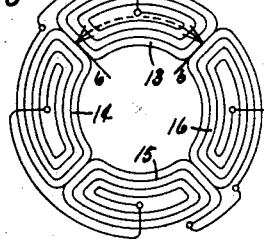
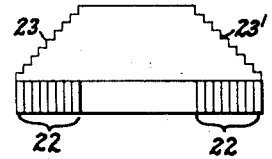
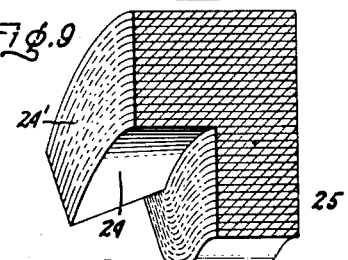
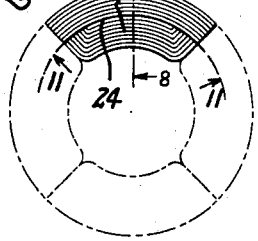
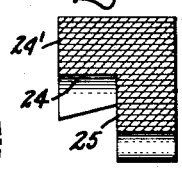
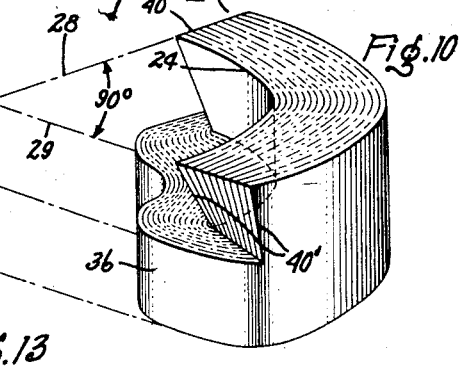
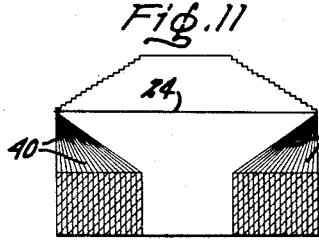
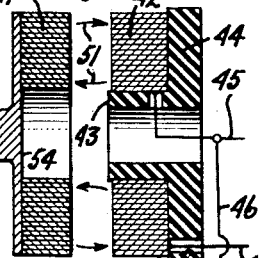
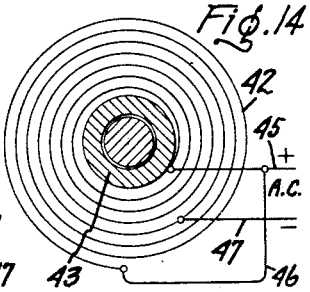
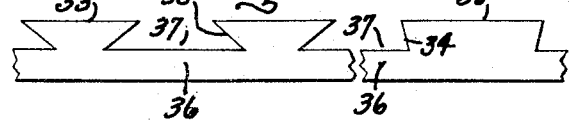
Inventor:
Edwin M. Dexter,
by Merton D. Moore
His Attorney.

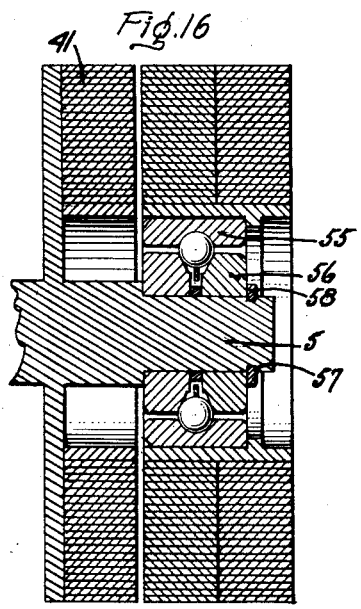
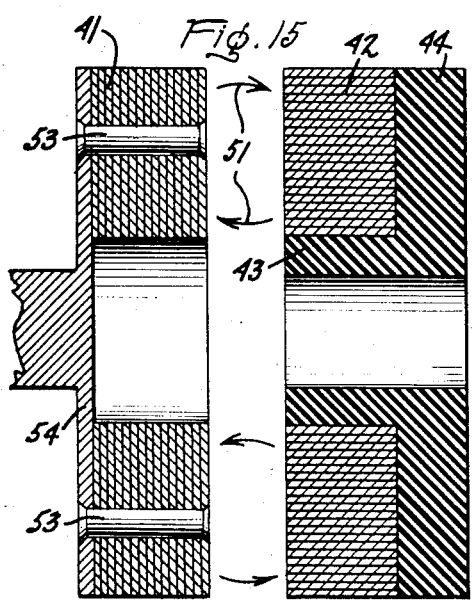

United States Patent Office 2,880,335
Patented Mar. 31, 1959

2,880,335
INDUCTION MOTOR

Edwin M. Dexter, Ballston Spa, N.Y., assignor to General Electric Company, a corporation of New York Application March 30, 1956, Serial No. 575,066

7 Claims. (Cl. 310—211)

My invention relates to magnetic induction apparatus, and it has for one of its objects to effect certain economies in the construction thereof.

My invention finds particular application in the electromagnetic field structures of electromagnetically operated switches and control devices, dynamoelectric machines, etc.

It has for one of its objects to provide a laminated field structure in which the laminations carry the electric current producing the magnetic field and also form at least a part of the magnetic path for the magnetic flux comprising such field. Such electric current is conducted longitudinally of the magnetic lamination while the flux passes edgewise of the laminations.

In accord with my invention, the field coils of such electromagnetic apparatus comprise a continuous strip of magnetic lamination wound longitudinally of itself to form a coil. This strip is connected between the electric terminals of the apparatus so as to carry current along the length of the strip. Flux produced by such current passes edgewise of the lamination to produce a north pole at one side of the coil and a south pole at the other.

In a motor, such coils may be arranged in a field yoke about the axis of the motor with each coil producing flux parallel to the axis and opposite in direction to that produced by adjacent coils. A squirrel cage rotor, for example, may be arranged in a plane parallel to the field yoke with a radial face adjacent said yoke whereby the rotor is driven by the flux produced by the stator field coils.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 represents the rotor of a motor employing my invention; Fig. 2 represents the field yoke of such a motor; Fig. 3 a stator member of the motor; Fig. 4 shows the motor incorporating structures such as those illustrated in Figs. 1, 2, and 3; Fig. 5 shows the circuit of the field yoke; Fig. 6 shows the magnetomotive force distribution along line 6 of one of the field coils represented in Fig. 5; Fig. 7 represents a modification of the field yoke shown in Fig. 2; Fig. 8 is a sectional view along the line 8—8 of Fig. 7; Fig. 9 is a perspective view of the field coil taken from the section illustrated in Fig. 8; Fig. 10 is a perspective view of a complete field coil as shown in Fig. 7; Fig. 11 is a sectional view along the line 11—11 of Fig. 7 showing, in addition, the magnetomotive force distribution; Fig. 12 shows a lamination shaped and adapted to be wound in a coil of the type illustrated in Fig. 8; Fig. 13 shows an electromagnetic control device having an actuating winding and armature for a control device employing my invention; Fig. 14 shows the electrical circuit thereof; Fig. 15 shows a modification of the structure of Fig. 13; and Fig. 16 shows a modification of the structure of Fig. 4.

Referring to Fig. 1 of the drawing, I have illustrated therein a rotor adapted for use in a motor employing my invention. This rotor is of disk form comprising an annulus having an outer circumference or ring 1 of conducting material and an inner circumference or ring 2 of conducting material with rotor bars 3 extending between the inner and outer circumferences 1 and 2. The space between the circumferences 1 and 2 is filled with magnetic laminations wound circumferentially about the inner circumference 2. The conducting rotor bars 3 extend through these laminations either in holes drilled through them or in slots cut in the face of the rotor, as desired. The rotor has a web 4 by which it is mounted and adapted for rotation about a shaft 5. The rings 1 and 2 are of large current carrying capacity and short circuit together the respective ends of the conducting rotor bars 3 thereby to form a squirrel cage rotor.

Fig. 2 shows the stator field yoke constructed in accord with my invention having an outer circumference 11 and an inner circumference 12 defining an annulus between which circumferences are mounted the field coils of the stator. This yoke is adapted for mounting in the motor coaxially with the shaft 5 of the rotor of Fig. 1. The field coils 13, 14, 15, and 16 are each wound of magnetic laminations, such as a steel strip of any suitable width, for example, about a median line or axis 17' to fill the space between the two circumferences 11 and 12 in a 90° sector of the annulus comprising the stator, each coil being wound, shaped, and fitted together with the other coils so that the entire space between the two circumferences 11 and 12 are completely filled with these laminar wound coils. The turns of the magnetic strips are insulated from each other in any suitable way as, for example, by oxidizing the surfaces of the strips either before or after winding. Of course, such laminations may be varnished for insulation purposes, or a strip of insulating material may be wound between the lamination turns.

Fig. 3 illustrates a magnetic annulus adapted for mounting adjacent the yoke of Fig. 2 and on the opposite side from the rotor, thereby to complete the magnetic path for flux generated by the coils 13, 14, 15, and 16 of the magnetic yoke. This annulus is shown as equipped with shading coils S mounted adjacnet the ends of the turns of the coils 13, 14, 15, and 16 for starting purposes. The use of such coils is common in induction motors to aid starting of the motor and their action will not be further described here.

Fig. 4 shows the rotor and stator members mounted in assembled relationship, the rotor 1 being mounted at the left having a shaft 5 supported in a bearing 18 about which are mounted the yoke comprising the outer circumference 11, the inner circumference 12, with the field coils mounted therebetween, and also comprising the stator member 17. These stator members and the bearing 18 are supported in a molded framework 19 which may be of a suitable nonconducting material, such as polystyrene or other plastic suitable for molding. Openings 20 are formed in this member 19 in alignment with corresponding holes 20 in the stator member 17 through which conductors leading to the field coils may be extended.

The bearing is shown as of the thrust type having the ball 25 mounted in a grease socket at the end of shaft 5 and against which the end of the shaft bears during operation of the motor due to attraction between the stator and rotor.

Fig. 5 shows the electrical circuit of the field coils of the stator yoke which may comprise a pair of terminals 21 between which may be impressed a suitable alternating electromotive force. The laminations of each of the coils 13, 14, 15, and 16 are shown as connected in series circuit relation between the terminals 21 whereby each coil produces flux extending edgewise of the laminations; i.e., at right angles to the plane of the drawing, and each coil being poled to produce flux in a direction opposite to that of each adjacent coil whereby alternate north and south poles are produced about each face of the yoke, the flux comprising such poles extending into the rotor on the one side and into the stator member 17 on the other side. That is, the flux from coil 13, for example, passes to the left into the rotor 1, edgewise of the laminations of rotor 1, and thence longitudinally of the laminations to points adjacent the coils 14 and 16 where it leaves the rotor laminations edgewise thereof and enters the laminations of coils 14 and 16, and thence passes edgewise into the laminations of stator 17, passes longitudinally thereof, and thence back into the coil 13. Thus, the laminations of the stator coils each comprise a part of the magnetic circuit produced by the current flowing in these same laminations, the current in the laminations of adjacent coils flowing in such direction that the different coils are aiding in the production of such flux.

Fig. 6 represents a section along the line 6—6 of Fig. 5, the lower portion 22 of the figure representing the laminations and the upper portion representing the distribution of the magnetomotive force produced thereby along the median line of the coil. The magnetomotive force, which is, of course, zero at the end of the coil, increases in stepwise form as indicated at 23, as each turn of the lamination is traversed, to a maximum, then remains constant over a large portion of the length of the coil, and then decreases likewise in stepwise form as indicated at 23' to the opposite end of the coil.

The motor construction thus described and illustrated has several advantages. The laminations of the field coils carry the flux producing current, thus reducing or eliminating the use of copper in the field structure while, at the same time, serving the usual purpose of reducing eddy current losses in the iron of the magnetic path. In addition, the field winding structure produces a flux distribution in the air gap between the rotor and stator similar to that of a distributed winding. This is shown by the trapezoidal field distribution illustrated at 23, 23' in Fig. 6. This field distribution is effective in reducing the production of harmonics of the impressed voltage in the circuits of the motor, with resultant reduction in negative torque produced by such harmonics.

I have illustrated my invention in a motor having a four pole stator but, of course, as many poles as desired may be employed, in which case each field coil occupies a circumferential angular space corresponding to the number of poles employed.

In some instances, it may be desirable to improve the conductivity of the lamination turns by coating, plating, or spraying them before winding on one or both sides with highly conducting material, such as copper or aluminum, and insulating in ways mentioned above; i.e., oxidizing the surfaces, varnishing, or insulating in other suitable ways.

In my construction, that portion of the lamination turns at the ends of the coil; i.e., adjacent to neighboring coils, extends in the radial direction. Where such portions are adjacent to the rotor, losses may be incurred by reason of this radial distribution. If such losses are of objectionable magnitude, the construction of field coil shown in Figs. 7, 8, 9, and 10, presently to be described, may be desirable.

Fig. 7 shows a modification of the field yoke of my invention in which a portion of the field coils of the stator yoke are cut away to reduce such losses caused by reason of the radial end portions of turns of the stator laminations being too closely adjacent to the rotor. These radially extending portions, such as those which lie in the segment X of Fig. 2, lie adjacent to the rotor and are spaced therefrom only by the amount of the air gap between the rotor and the stator. This proximity between the rotor and the radially extending end sections of the lamination turns may be objectionable. To reduce losses which may be incurred thereby, the portion of the coils illustrated in Fig. 7 within a circumference represented at 24, which may extend along a median line of the coil, is cut away so that the laminations within this circumference may have only a fraction of the width of the laminations without that circumference.

Fig. 8 shows a section along the line 8—8 of Fig. 7 showing the cutaway portion at 25, the circumference 24 of Fig. 7 being indicated at 24 in Fig. 8. The rotor of the assembled motor is, of course, spaced from the left hand edge of the laminations shown in Fig. 8 by the amount of the axial air gap.

Fig. 9 shows a perspective view of the coil of Fig. 7 taken from the section shown in Fig. 8. The surface 24' faces the air gap of the motor.

Fig. 10 shows a perspective view of a complete coil adapted for use in a stator yoke of the form shown in Fig. 7. This complete coil is shaped for use within a 90° sector of the annulus lying between the dotted radial lines 28 and 29 extending from the axis 30 of the rotor to the outer periphery of the yoke. The portion of the coil within the circumference 24, which is coaxial with the rotor shaft, is cut away to reduce losses incurred by reason of proximity between radial end sections of the turns of the coil laminations and the rotor which may be adjacent to the upper surface 32 of the coil.

Fig. 11 is a sectional view along the circumferential line 11—11 of Fig. 7, the lower portion of the figure showing the laminations as cut along line 24. The lines 40—40' of Fig. 1 represents the ends of the laminations as indicated at 40—40' in Fig. 10 as viewed from the rotor axis. The portion of the figure above the horizontal line 24 shows the magnetomotive force along line 24, this magnetomotive force distribution being similar to that illustrated in Fig. 6.

Fig. 12 shows the shape of a lamination adapted to be wound into a coil of the form shown in Fig. 10, the lamination being illustrated as broken to indicate length. In this figure, the upper projecting portions 33, 34, and 35 are shaped to comprise the upper projecting portion of the stator coil of Fig. 10. The lower portion 36 comprises that portion of the lamination which completes the entire turn of the coil of Fig. 10. The cutaway portions 37 are, of course, of increasing length along the length of the lamination and the slope of the cut as indicated at 38 progressively increases toward the vertical at the end corresponding to the outer turn of the lamination; i.e., the right hand end as illustrated in Fig. 12.

Fig. 13 shows an electromagnetic apparatus adapted for the actuation of an armature 41, for example, having a shaft 41' which may be connected to the movable element of a switch or other control member. The coil 42 comprises a magnetic lamination wound in the form of a coil about an arbor 43 which may comprise any suitable non-conductive material, such as polystyrene. This arbor 43 may project from a disk 44 of the same material extending parallel to the plane of the coil 42. Arbor 43 and disk 44 may be molded together with the laminar coil in place so that the coil is held firmly after the plastic sets or hardens.

The magnetic material of the armature may likewise comprise laminations 41 wound in the same way so that it is attracted by a magnetic field produced by the coil 42.

The inner turn and the outer turn of the lamination of coil 42 may be connected together by a conductor 46 and to a terminal 45. The connection of the inner turn may be brought out through a hole in the arbor 43. Any suitable intermediate turn on the lamination may be connected to a terminal 47, this connection being brought out through a hole 47' in the disk 44. The connection is then as illustrated in Fig. 14, in which the spiral line 42 represents the lamination of coil 42 of Fig. 13 being wound about the arbor 43 and having the electrical connections between terminals 45 and 47 as indicated on the drawing. When so connected, a field is produced in the direction of the arrows 51, as shown in Fig. 13, in response to electromotive force between the terminals 45 and 46; i.e., the outer turns produce flux having direction opposite to that produced by the inner turns, the magnetic path of such flux being completed through the magnetic material 41 of the armature thereby to attract the armature and effect the desired control operation. Thus, the north and south poles are cylindrical in form and coaxial.

Fig. 15 is similar to Fig. 13, but shows the laminations of the armature 41 extending in a radial plane instead of circumferentially, the various laminations being bolted or riveted together and to the disk 54 to which the rivets or bolts 53 may be spot welded.

Fig. 16 illustrated a modification of the motor shown in Fig. 4 in which the thrust bearing 18 is replaced by a ball bearing having an outer race 55 mounted within the stator structure and an inner ball race 56 through which the shaft 5 of the rotor extends. The shaft 5 may be locked to the ball race 56 by means of the circumferential groove 57 and ring 58.

While I have shown specific embodiments of my invention, it will, of course, be understood that I do not wish to be limited thereto since various arrangements and modifications of the structure of my invention may be made, and I intend by the appended claims to cover any such structures and modifications as fall within the true spirit and scope of my invention.

What I claim as new and desire to secure by Letters Patent of the United States is:

1. The combination, in an electromagnetic apparatus, of a magnetic field producing coil comprising a strip of magnetic lamination wound to form said coil, an armature in the field of said coil, a pair of circuit terminals, one of said terminals being connected to an intermediate point on said lamination and the other terminal being connected to points on opposite sides of said intermediate point whereby said coil produces flux edgewise of said lamination forming coaxial north and south poles.

2. The combination, in an induction motor, of a stator comprising a plurality of field coils, each coil comprising a thin strip of magnetic lamination wound lengthwise upon itself, the different coils being shaped and fitted together to form an annulus about the axis of the motor, the axis of each coil being parallel with the axis of the motor, and said annulus having width corresponding to the width of said strips of magnetic laminations, the laminations of the different coils being connected in such circuit relation between a pair of terminals that when alternating voltage is applied between said terminals each coil produces a magnetic field axially of the motor and opposite that of adjacent coils in said annulus, and a rotor in a plane parallel to said annulus adapted to be driven by the magnetic fields produced by said coils, said rotor comprising laminations extending circularly about the axis of said rotor and edgewise of said field coils whereby flux produced by said field coils enters said rotor edgewise of said laminations of said rotor and extends longitudinally of said rotor laminations and leaves them edgewise of the laminations at a point adjacent the adjacent field coils.

3. An induction motor comprising three disks in parallel planes about a common axis, one of the outside disks comprising a rotor, the other outside disk comprising a magnetic annular stator member coaxial with the axis of the motor, and the middle disk comprising coils of magnetic laminations arranged about, and with axes parallel to the axis of the motor, a pair of circuit terminals, the magnetic laminations of the coils of said middle disk being connected in circuit relation between said terminals to produce magnetic fields axially of said motor and extending into said outer disks, the field produced by any coil being opposite that of any adjacent coil, said outside disks comprising laminations extending circularly about said common axis and in edgewise relation to laminations of said coils whereby flux produced by said coils enters said last laminations edgewise thereof and extends longitudinally thereof between said coils.

4. In an induction motor, a magnetic stator annulus, a squirrel cage rotor in a plane parallel with said stator annulus and coaxial therewith, and a set of field coils attached to said annulus and forming a second annulus in a plane between said first annulus and rotor, the coils of said second annulus being equally spaced about the axis of said rotor and each coil comprising a narrow strip of magnetic material wound lengthwise of itself about an axis parallel with the axis of said rotor, a pair of circuit terminals, the laminations of said coils being connected to carry current between said terminals to produce a magnetic field parallel to said axis and extending into said rotor and said first annulus, the direction of field produced by any coil being opposite to that produced by any adjacent coil, whereby the magnetic laminations of said coils serve to carry the current, to produce the magnetic flux of the motor field coils, and to comprise a part of the magnetic path for said flux, and the stator annulus and squirrel cage rotor comprising laminations extending circularly about said axis and at a radius such that flux produced by said field coils enters and leaves said last laminations edgewise thereof.

5. The combination, in a motor, of a magnetic stator annulus, a rotor in a plane parallel to the plane of said annulus, a stator field yoke between said rotor and annulus, said field yoke comprising a plurality of coils about the axis of said rotor, each coil comprising a strip of magnetic material wound about an axis parallel with said axis of said rotor and connected to carry current during operation of the motor thereby to produce magnetic flux extending in the edgewise direction of said strip and into said rotor, the portions of said magnetic laminations nearer the axis of said rotor being narrower and farther spaced from said rotor than portions more distant from the axis of the rotor.

6. The combination, in a motor, of a field yoke comprising a plurality of field coils arranged in the form of an annulus, each coil occupying and shaped in the form of a sector of said annulus and comprising a strip of magnetic lamination wound about a median line of said sector and adapted during operation to carry current throughout its length thereby to produce magnetic flux in a direction edgewise of said lamination, and a rotor and stator annulus on opposite sides of said yoke each having laminations arranged to form continuous paths for flux extending from one field coil to another, said paths being free of broad side lamination surfaces traversed by said flux.

7. The combination, in a motor field yoke, of a plurality of field coils arranged in the form of an annulus, each coil occupying and shaped in the form of a sector of said annulus and comprising a strip of magnetic lamination wound about a median line of said sector and adapted during operation to carry current throughout its length thereby to produce magnetic flux in a direction edgewise of said lamination, all of said field coils having a cutaway portion of external radius less than the radius of the yoke on the side of the yoke to be located adjacent the motor rotor in operation.

References Cited in the file of this patent

UNITED STATES PATENTS

| | | |
|---|---|---|
| 257,999 | Ball | May 16, 1882 |
| 426,348 | Wightman et al. | Apr. 22, 1890 |
| 595,402 | Millis | Dec. 14, 1897 |
| 1,567,319 | Davis | Dec. 29, 1925 |
| 1,605,796 | Tanzler | Nov. 2, 1926 |
| 1,897,184 | Zopp | Feb. 14, 1933 |